US009674411B2

(12) United States Patent
Cover

(10) Patent No.: US 9,674,411 B2
(45) Date of Patent: Jun. 6, 2017

(54) PORTABLE CAMERAS AND RELATED METHODS

(71) Applicant: Lund Motion Products, Inc., Buford, GA (US)

(72) Inventor: Scott Cover, Fullerton, CA (US)

(73) Assignee: LUND MOTION PRODUCTS, INC., Buford, GA (US)

( * ) Notice: Subject to any disclaimer, the term of this patent is extended or adjusted under 35 U.S.C. 154(b) by 4 days.

(21) Appl. No.: 14/749,192

(22) Filed: Jun. 24, 2015

(65) Prior Publication Data

US 2015/0381859 A1  Dec. 31, 2015

Related U.S. Application Data

(60) Provisional application No. 62/017,058, filed on Jun. 25, 2014.

(51) Int. Cl.
*H04N 5/225* (2006.01)
*H04W 84/12* (2009.01)

(52) U.S. Cl.
CPC .......... *H04N 5/2252* (2013.01); *H04W 84/12* (2013.01)

(58) Field of Classification Search
CPC ............................ H04N 5/2252; H04W 84/12
USPC .................................................. 348/373–376
See application file for complete search history.

(56) References Cited

U.S. PATENT DOCUMENTS

| 6,431,507 | B2 * | 8/2002 | Prather | 248/166 |
|---|---|---|---|---|
| D760,310 | S * | 6/2016 | Pacurariu | D16/202 |
| D760,829 | S * | 7/2016 | Pacurariu | D16/202 |
| D761,340 | S * | 7/2016 | Pacurariu | D16/202 |
| 2005/0068423 | A1 * | 3/2005 | Bear | H04N 7/147 348/207.99 |
| 2006/0171704 | A1 * | 8/2006 | Bingle | B60R 11/04 396/419 |
| 2007/0104477 | A1 * | 5/2007 | Misawa | G03B 17/04 396/299 |
| 2013/0088639 | A1 * | 4/2013 | Mundt | H04N 5/2251 348/372 |
| 2014/0118477 | A1 * | 5/2014 | Dodd | H04N 7/15 348/14.13 |
| 2014/0160290 | A1 * | 6/2014 | Wu | B60R 1/00 348/148 |

* cited by examiner

*Primary Examiner* — Sinh Tran
*Assistant Examiner* — Zhenzhen Wu
(74) *Attorney, Agent, or Firm* — Knobbe Martens Olson and Bear LLP

(57) ABSTRACT

A wireless camera system and related methods are disclosed in which the camera system has a camera body and a mounting base. The camera body has electronics to create a wireless connection hotspot that can be connected to wireless connection enabled device. The mounting base can be positioned on any surface and can include one or more magnetic inserts to mount the camera system on a magnetic surface, such as to a car chassis.

23 Claims, 8 Drawing Sheets

PORTABLE CAMERAS AND RELATED METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to cameras and related methods with specific discussions on portable wireless cameras that can generate wireless communication hotspot and related methods.

Description of the Related Art

Many portable devices today can communicate wirelessly. One typical mode of wireless communication is Wi-Fi or WiFi, which is a technology that allows an electronic device to exchange data or connect to the internet wirelessly using 2.4 GHz UHF and 5 GHz SHF radio waves, as examples. Many devices can use Wi-Fi, e.g., personal computers, video-game consoles, smartphones, some digital cameras, tablet computers and digital audio players. These devices can connect to a network resource, such as the Internet, via a wireless network access point. Such an access point (or hotspot) has a range of about 20 meters (66 feet) indoors and a greater range outdoors due to less interference. Hotspot coverage can comprise an area as small as a single room with walls that block radio waves, or as large as many square kilometers achieved by using multiple overlapping access points.

Wireless WiFi IP cameras are also well known for use to transmit video over the Internet, which are typically used with desktop computers to allow users to transmit images of themselves while communicating. Still cameras, such as point and shoot cameras, can also have built-in Wi-Fi transmitters for transmitting the photos taken to a camera or to post the pictures on the Internet. Finally, camcorders are also Wi-Fi enabled to allow the user to send video directly from the camcorder to social networks or computers.

SUMMARY

A camera system comprising a camera body fixedly secured to a mounting base; wherein said camera body comprises a housing having a first upper side and a second lower side and having a camera lens and electronics for generating wireless signals to create a wireless connection hotspot located inside the housing; wherein said mounting base comprises a base anchor projecting into the housing and having a mounting frame projecting away from the second lower side, a mounting leg pivotably connected to the mounting frame having a lower leg joint with at least one magnetic insert located further away from the first upper side than the second lower side for mounting the camera system to a metallic surface.

A camera system comprising a camera body fixedly secured to a mounting base; wherein said camera body comprises a housing having a central axis, a first upper side, and a second lower side and having a camera lens and electronics for generating wireless signals to create a wireless connection hotspot located inside the housing; and a ring having at least two openings rotatably mounted about the central axis and rotatable to at least one of expose the lens or cover the lens; wherein said mounting base comprises a lower leg joint having at least one magnetic insert located further away from the first upper side than the second lower side for mounting the camera system to a metallic surface.

A method for using a camera system comprising a camera body fixedly secured to a mounting base; said method comprising: placing a magnetic insert located on the mounting base to a metallic surface of an automobile; powering up the camera body to produce a WiFi signal and creating a WiFi hotspot; and using the WiFi signal to connect a WiFi enabled device to the camera body.

Disclosed herein are embodiments of a camera system comprising a camera body fixedly secured to a mounting base, the camera body comprising a housing having a central axis, a first upper side, and a second lower side and having a camera lens and electronics for generating wireless signals to create a wireless connection hotspot located inside the housing and operating the camera system, and a ring having at least one opening rotatably mounted about the central axis and configured to rotate between an open position to expose the lens so that the at least one opening is positioned over the lens to a closed position to cover the lens, the mounting base comprising a lower leg joint comprising at least one magnetic insert located further away from the first upper side than the second lower side for mounting the camera system to a metallic surface.

In some embodiments, the ring can have a second opening configured to be rotatable to expose or cover a light source. In some embodiments, the light source can be an LED light source. In some embodiments, the lower leg joint can comprise a plurality of magnetic inserts. In some embodiments, the housing can comprise a camera switch and power port. In some embodiments, the ring can have a third opening and a fourth opening configured to be rotatable to expose or cover the camera switch and power port.

In some embodiments, an audible signal can occur when the ring is in the open position and the closed position. In some embodiments, rotation of the ring to the open position can activate the electronics for the camera system. In some embodiments, rotation of the ring to the closed position can deactivate the electronics for the camera system.

In some embodiments, the camera system can further comprise software configured to vertically flip an image from the camera lens. In some embodiments, the camera system can further comprise a microphone. In some embodiments, the camera body can rotate with respect to the mounting base.

Also disclosed herein are embodiments of a method for using a camera system, the method comprising placing a magnetic insert located on a mounting base fixedly secured to a camera body on a metallic surface of an automobile, the camera body comprising a housing having a central axis, a first upper side, and a second lower side and having a camera lens and electronics for generating wireless signals to create a wireless connection hotspot located inside the housing and operating the camera system, and a ring having at least one opening rotatably mounted about the central axis and configured to rotate between an open position to expose the lens so that the at least one opening is positioned over the lens to a closed position to cover the lens, powering up the camera body to produce a WiFi signal and creating a WiFi hotspot, and using the WiFi signal to connect a WiFi enabled device to the camera system.

In some embodiments, the ring can have a second opening configured to be rotatable to expose or cover a light source. In some embodiments, the light source can be an LED light source.

In some embodiments, the method can further comprise rotating the ring to the open position to activate the electronics for the camera system. In some embodiments, the method can further comprise rotating the ring to the closed position to deactivate the electronics for the camera system. In some embodiments, the housing can comprise a camera switch and power port. In some embodiments, the ring can have a third opening and a fourth opening configured to be rotatable to expose or cover the camera switch and power port.

Also disclosed herein are embodiments of a camera system comprising a camera body comprising a housing having a central axis, a first upper side, and a second lower side and having a camera lens and electronics for generating wireless signals to create a wireless connection hotspot located inside the housing and operating the camera system, and a ring having at least one opening rotatably mounted about the central axis and configured to rotate between an open position to expose the lens so that the at least one opening is positioned over the lens to a closed position to cover the lens, and a mounting base comprising at least one magnetic insert, the mounting base fixedly secured to the camera body.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of embodiments of portable cameras provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
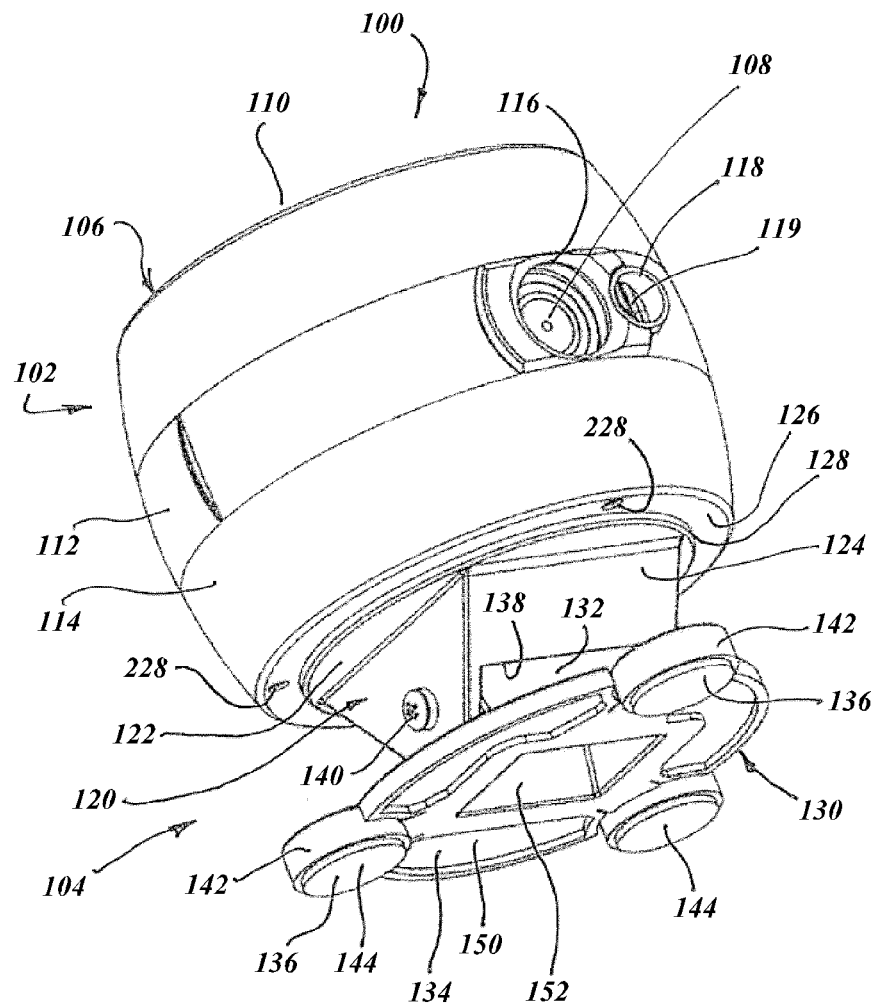
FIG. 1 is a schematic perspective view of a camera system comprising a camera body and a mounting base provided in accordance with aspects of the present disclosure.

With reference now to FIG. 1, a perspective view of a portable camera system provided in accordance with aspects of the present disclosure is shown, which is generally designated 100. The camera system 100 is shown with a camera body 102 and a mounting base 104. The camera body 102 has a housing 106 for holding or accommodating the camera lens 108 and other electronic components, as further discussed below. The lens 108 can have a fixed focal length selected to provide the camera with the wide viewing angle and an adequate viewing depth, though the focal length and particular viewing angle does not limit the disclosure. The mounting base 104 is sized and shaped to support the camera body 102 and to enable the camera body 102 to be mounted, such as placed, onto a surface or to attach to any number of magnetically attractive structures, such as to other magnets or to certain metals. For discussion purposes, the front of the camera is where the lens 108 is located with the top, bottom, and side of the camera flowing from the front reference point.

The housing 106 can comprise two or more housing components assembled to form an enclosure. As shown, the housing 106 can comprise a top or cap 110 rotatably mounted relative to a housing ring 112, which can be rotatably mounted relative to a housing base or bottom 114. In some embodiments, the top 110 and the housing base 114 can be fixed relative to one another. As further discussed below, the ring 112 can be rotatable relative to cap 110 and the housing base 114 about a vertical housing axis to expose the lens 108 or to cover the lens 108. A separate mechanical switch, apart from the ring 112, can be provided to turn power to the camera unit on or off. In some embodiments, the ring 112, when rotated, can trigger the on/off switch automatically such as separate manipulation is not required to turn the camera on/off.

The housing components 110, 112, 114 may be made from a rigid plastic, such as from a polycarbonate (PC) material, a polyvinyl chloride (PVC) material, polyamide (PA), or high-density polyethylene (HDPE), to name a few, though the particular material does not limit the disclosure. In some embodiments, the housing components 110, 112, 114 can be cast or extruded from a thin metal material, such as sheet metal or aluminum.

In some embodiments, only two housing components may be employed to form the housing cavity for accommodating the camera components, such as the lens. For example, the ring 112 may be part of the cap or the housing base 114, such as being unitarily formed therewith or alternatively fixedly attached therewith such as with detents or screws, or other fixing means, to reduce the number of housing components. In some embodiments, the housing 106 can be made from multiple different materials, such as from a combination of plastic and metal or from multiple different plastic materials. A separately slidable shield or cap may be employed to cover the lens 108, such as to slide over the opening 116 or to attach to and cover the opening. In the some embodiments, the ring 112 can function as a closure system to expose or close the lens 108. A second opening 118 on the ring 112 is shown located adjacent the lens opening 116. The second opening 118 may be provided for a camera light 119, such as an LED light, which can optionally be incorporated to provide added lighting for the camera.

The mounting base 104 shown can comprise a base anchor 120, which can comprise a base plate 122 and a mounting frame 124. In some embodiments, the base anchor 120 can be made from the same material as the camera body 102. In some embodiments, the base anchor 120 is made from a different material, which can be a different plastic or a different metal material, though the particular materials do not limit the disclosure. In some embodiments, the base plate 122 can be unitarily formed with the base anchor 120, such as by injection molding. The base plate 122 can be sized and shaped to engage the rim 126 on the housing base 114, as further discussed below, and the mounting frame 124 projects away from the rim opening 128. Thus, in the embodiment shown, the mounting base 104 can be fixedly secured to the camera body 102 and the base anchor 120 is not removable therefrom without first disassembling the camera body 102. In some embodiments, the base anchor 120 can be removably attached to the camera housing 102 and removable therefrom without disassembling the camera body. In some embodiments, the base plate 122 can be fixedly secured to the camera body 102 and the base anchor 120 is removably secured to the base plate 122.

The mounting base 104 further can comprise a mounting leg 130, which can comprise an upper leg joint 132 pivotably connected to the mounting frame 124 and a lower leg joint 134 which can comprise three spaced apart feet 136 with two or more than three feet 136 contemplated. As shown, the upper leg joint 132 and the lower leg joint 134 of the mounting leg 130 can be unitarily formed from the same or similar material as the camera body. In some embodiment, the mounting leg 130 can be made from a different material, which can be a different plastic or a different metal material. In some embodiments, the upper and lower leg joints can be mechanically engaged to one another, glued to one another, welded to one another, or combinations thereof, and the particular attachment does not limit the disclosure.

As shown, the upper leg joint 132 can project into an opening 138 formed on or in the mounting frame 124 and held thereto with a fastener or screw 140. The camera body 102 and the base anchor 120 can be rotatable relative to the mounting leg 130 about the screw 140, which allows the camera to tilt to change the field of vision of the lens 108.

The lower leg joint 134 can have three spaced apart receptacles 142, each of which forming part of the respective foot 136. An insert 144 can be positioned in each receptacle 142 having a thickness extending outside and beyond the opening of each receptacle. As shown, the receptacles 142 and the inserts 144 can both be generally round. In some embodiments, the shape can be different, such as square or oval to change the overall area of each foot, and the particular shape does not limit the disclosure. In some embodiments, the insert can be a pliable material configured to cushion the mounting base 104 when the same is placed on a planar surface, such as on a counter top or a dashboard of a car, as non-limiting examples. The inserts 144 can be made of a tacky or sticky material, such as from a soft rubber material, to improve friction and minimize slippage when placed on a planar surface. In some embodiments, the inserts 144 are magnets that a glued or bonded to an interior surface of each receptacle 142. The magnets can be of a permanent type and can be made from any number of commercially material compositions, such as neodymium iron boron, samarium cobalt, alnico, or ceramic or ferrite. The magnets allow the camera system 100 to be mounted to a metal surface, such as to a trunk or chassis of a car, to a metallic sliding, to a metallic door frame, to a refrigerator door, etc., to name a few.

As further discussed below, the camera system 100 can be mountable to a frame of a car and can generate wireless, or wired, communication signals to provide a hotspot for connectivity to wireless communication enabled devices. Thus, the camera system 100 can comprise an antenna for emitting Wi-Fi signals. For example, the camera system 100 can be operable to generate a WiFi hotspot and operable with a Wi-Fi enabled device, such as to a smartphone, a tablet, or a car's display screen, to provide the driver with a view captured by the camera lens 108. When the camera system 100 is mounted below the vehicle at the front chassis, images taken by the camera lens and viewed through the Wi-Fi enabled device can provide the user with valuable information, such as the vehicle clearance, obstacle to avoid, and/or to show a path for maneuvering purposes. Such capabilities are valuable when hauling a trailer, when backing up the vehicle, when driving off road, when crossing a tight path or bridge, etc. A microphone can also be incorporated inside the camera system to pick up noise at or near the camera, which can also be transmitted to a Wi-Fi enabled device. In some embodiments, a single larger magnet can be provided at the lower outer surface 150 of the lower leg joint 134. The magnetic force of the single larger magnet or the spaced apart magnets, in the form of inserts, may be adjusted by selecting the appropriate magnet type, magnet size, or both. Also shown in the perspective of FIG. 1 is a generally rectangular bottom opening 152, which can provide access for a mold to form the upper leg joint 132.

Figure 2:
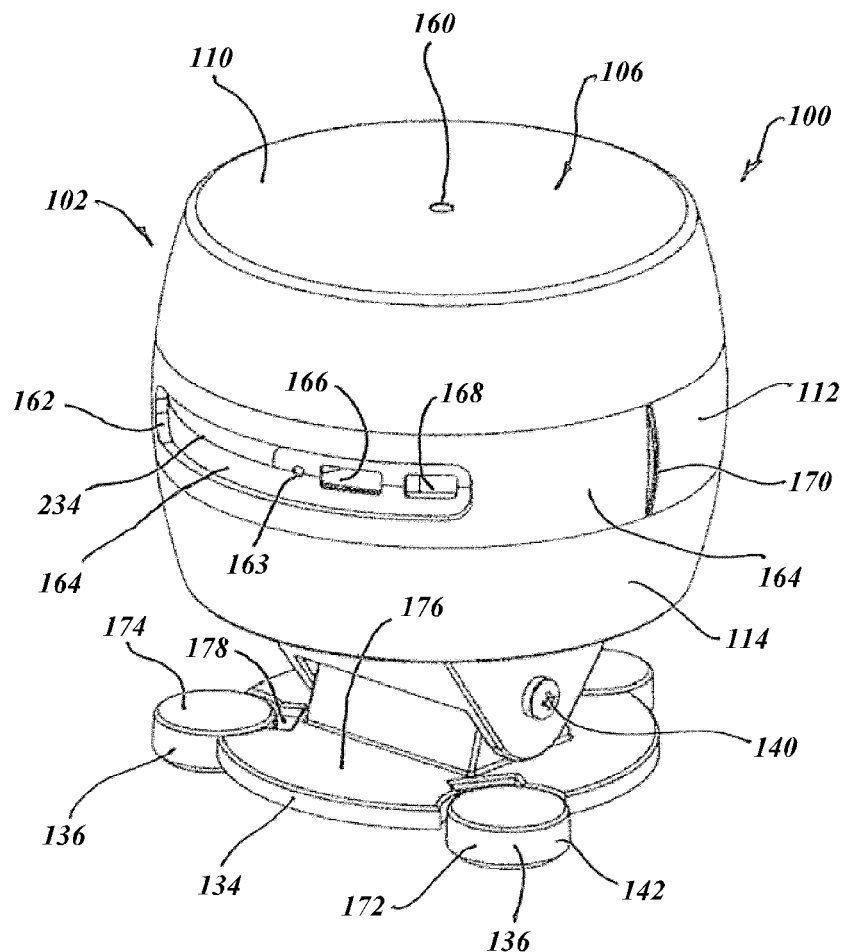
FIG. 2 is a schematic perspective view of the camera system of FIG. 1 from a 25 different viewing angle.

With reference now to FIG. 2, a perspective view of the camera system 100 of FIG. 1 is shown from a different viewing angle. A vent port 160 can be provided through the cap 110. Multiple vent ports may optionally be provided throughout the various housing components 110, 112, 114 or eliminated altogether as the mating parts can be provided with sufficient clearance for adequate venting without separate vent ports.

A ring opening 162 can be provided through the ring body 164, which exposes the housing frame 164 located inside the housing components 110, 112, 114. In the open position of the ring 112 shown in FIG. 2, which is from a different perspective of the view shown in FIG. 1, the ring opening 162 can be positioned over and exposes a housing frame 164, which carries a camera switch 166 and a power port 168, which in the present embodiment is a micro USB port. The micro USB port can be used to charge an internal rechargeable battery or batteries. The port may also be used to update firmware, software, or to download information. An optional reset button 163 may be provided to reset the system, such as to reboot or to reset to original manufacturer settings. Concurrently, the first opening 116 can be disposed over and exposes the lens 108 while the second opening 118 can be aligned with and exposes the camera light 119 (FIG. 1). Thus, the three openings 108, 118, 162 on the ring 112 are understood to be arranged such that when rotated to the ring open position shown, the openings align with the switch 166, power port 168, lens 108, and camera light 119, respectively. The ring rotation to the ring open position shown in FIGS. 1 and 2 may be facilitated by providing an audible feedback and/or snap fit arrangement. For example, one or more ridges 170 may be provided on the ring for engaging a corresponding surface feature on the housing frame 164 when the ring is rotated relative to the other housing components and proper angular alignment is attained. In some embodiments, rotation of the ring 112 to the ring open position automatically causes a lever or projection on the ring to activate the camera switch 166. The housing frame 164, which the camera switch 166, the power port 168, the camera lens 108, and the camera light 119 can be mounted to, are understood to be stationary while the ring 112, which has the first opening 116, the second opening 118, and the ring opening 162, is understood to rotate about a housing vertical axis in some embodiments.

As is more clearly shown from the perspective of FIG. 2, the three receptacles 142 can be generally cylindrical in shape and each can comprise an arcuate or curved sidewall 172 and a generally planar top wall 174, which rises above the upper outer surface 176 of the lower leg joint 134. A relief or recess 178 can be provided in between each receptacle 142 and the lower leg joint 134 to permit some flexibility or degree of freedom for each respective foot 136. For example, when the surface to be mounted is not generally flat, the flexibility in each foot 136 to deflect relative to the lower leg joint 134 still allows for a firm connection between each foot and the surface. In some embodiments, a pair of slits can be provided to form a leaf spring for each foot 136, as further discussed below with reference to FIG. 7.

Figure 3:
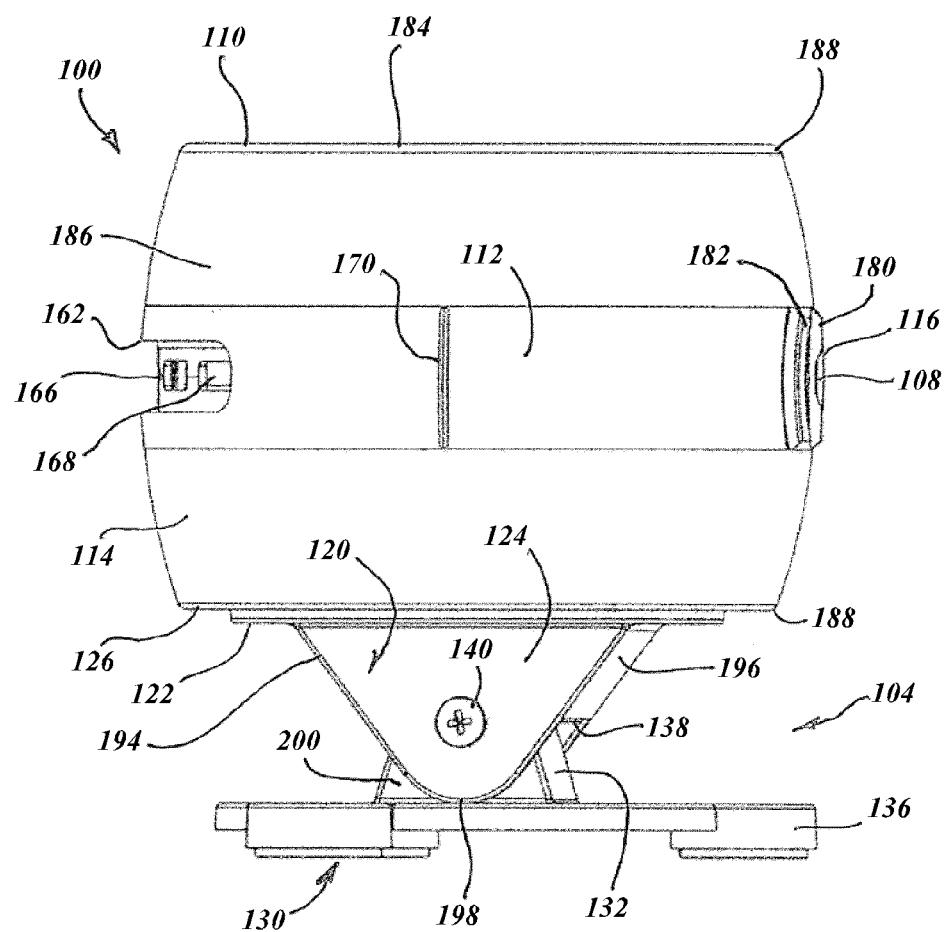
FIG. 3 is a side elevation view of the camera system of FIG. 1.

With reference now to FIG. 3, side elevation view of the camera system 100 of FIG. 1 is shown, which shows the ring opening 162 and the first opening 116 on the ring 112 being generally diametrically opposed, though other positions can be used as well. Also shown in the present side view is a raised face plate 180 about the first opening 116, which gives the lens 108 an appearance of being a zoom lens having retractable or telescoping components. A gap 182 can be further provided to give the raised face plate 180 a realistic projection. In some embodiments, simple openings are employed without raised surfaces.

The top surface 184 and the bottom rim 126 of the camera, which may also be referred to as the first upper side 184, and the second lower side 126, can be generally parallel to one another while the contour of the body section or body contour 186 of the camera body 102 can be generally convex, which overall resembles a barrel. In some embodiments, the camera body has a same proportion as a typical wooden barrel. In some embodiments, the diameter to height scale or ratio differs from a typical wooden barrel. Chamfered surfaces 188 are optionally provided to soften the corner edges of the camera body 102. However, the specific dimensions of the camera body 102 are not limiting.

The mounting base 104, which again comprises a base anchor 120 and a mounting leg 130, allows the camera body 102 to pivot about the screw 140. Thus, the camera lens 108 can pan up and down when the camera body 102 is pivoted about the screw 140. To turn the lens-side-to-side, the mounting base 104 can be repositioned to the desired angle, such as lifting the mounting base 104 from a surface and replacing the mounting base 104 at a different angular position. In some embodiments, a second set of pivot pin is provided to enable side-to-side rotation. In some embodiments, the base plate 122 of the base anchor 120 is allowed to rotate relative to the lower rim 126 of the housing base 114, which allows the lens to rotate side-to-side in addition to panning up and down about the screw 140. As further discussed below, matching teeth can be incorporated as a ratcheting system to enable rotation of the camera body relative to the base about the vertical axis of the camera.

The mounting frame 124 is shown with two side flanges 194 connected to one another by intermediate plates 196. The side flanges 194 can be generally triangular in configuration and each has an upside-down apex 198. This provides the camera system 100 with a readily perceived sense of direction of tilt. The upper leg joint 124 has a similar configuration with generally triangular side walls 200 each with an apex that projects into the opening 138 of the base anchor 120. Pivoting tension can be adjusted by tightening the screw 140.

Figure 4:
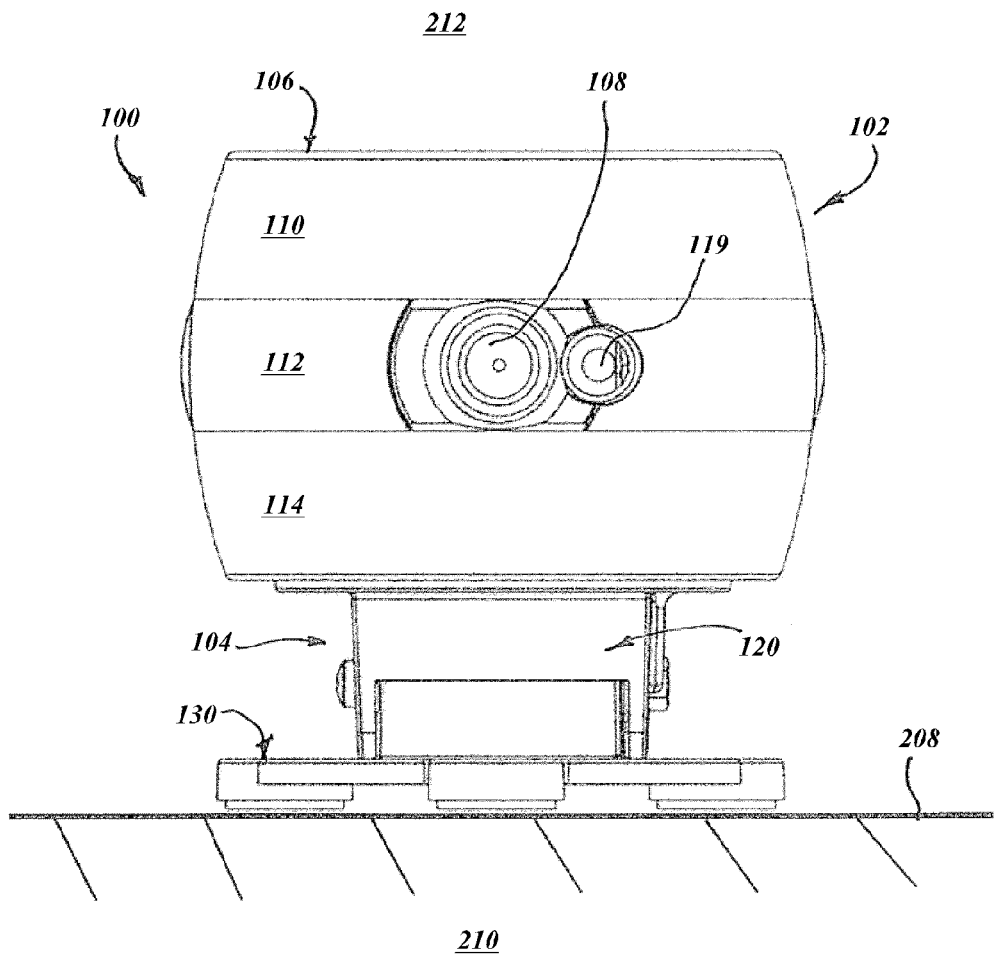
FIG. 4 is a front elevation view of the camera system of FIG. 1.

FIG. 4 is a front elevation view of the camera system 100 of FIG. 1 placed against a surface 208 of a structure 210. In some embodiments, the structure 210 is a dashboard, a counter top, a table top, a book shelf, a fireplace mantel, a dresser, a rock, or any number of manmade or natural structures. As shown, the camera is mounted with the camera body 102 facing up, towards the sky 212. In an alternative embodiment, the structure 210 is a car chassis and element "212" is the ground or towards the ground. In other words, in the some embodiments, the camera body 102 can be facing the ground and away from the sky. For example, during an off-road driving excursion, the camera system 100 may be placed at the front chassis to provide the driver with a view of the ground for rocks and other obstructions while traversing the dirt road. Software may be provided to reorient the image from the camera for proper viewing orientation. The camera may also be placed on or near the front bumper or at a different location of the car that the driver desires to view from. In some embodiments, two or more camera systems 100 may be mounted at different locations of the car. This gives the driver multiple views from the different camera angles. The driver can toggle between different cameras on his or her Wi-Fi enabled device to view images from the different cameras.

Figure 5:
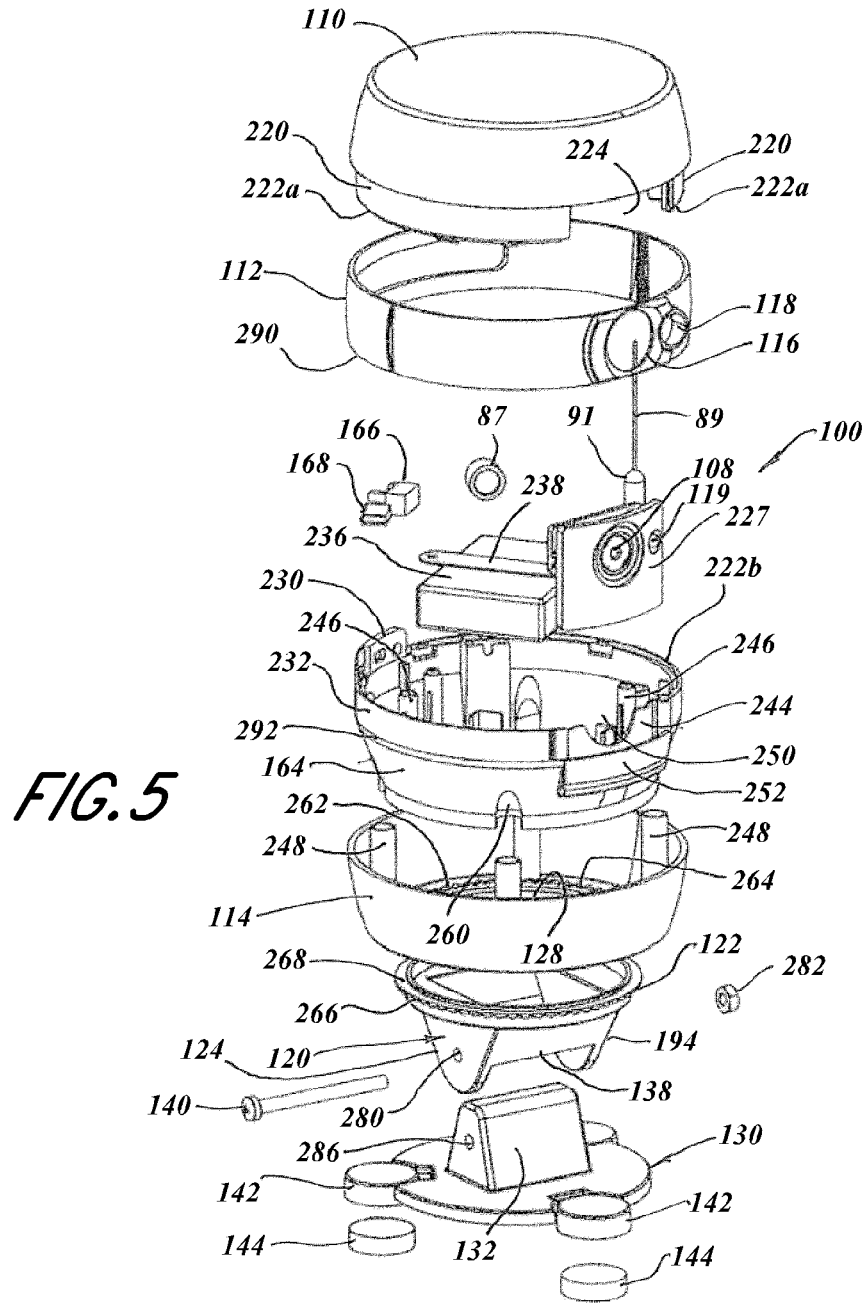
FIG. 5 is a schematic exploded view of the camera system of FIG. 1 showing various structural features of the camera body and the mounting base.

FIG. 5 shows an exploded simplified view of the camera system 100 of FIGS. 1-3. The top or cap 110 is shown with two spaced apart ribs 220 each with detents 222*a* for engaging corresponding detents 222*b* on the housing frame 164. In some embodiments, the cap can be provided with female threaded bores for receiving the hold down screws that passes from the bottom of the housing through the hold down bores 228 located on the rim 126 (FIG. 1). A gap 224 can be provided between the two ribs 220 to the front of the camera and to the rear of the camera for a total of at least two gaps 224. The front gap 224 can be sized to receive the lens and lighting panel 227 while the rear gap 224 can be sized and shaped to receive the switch and port panel 230 mounted to the housing frame 164.

The ring 112 can be sized and shaped to ride around the outer surfaces of the two ribs 220 extending from the housing top 110, which acts as tracks to support the ring 112. The housing frame 164 also has tracks 232 for supporting the ring 112. The interface 234 between the ribs 220 on the housing top 110 and the tracks 232 on the housing frame 164 can be seen through the ring opening 162 in FIG. 2.

Also shown the lens and light panel 227 is the light source, such as LED 119, a fixed focal length lens 108, an on/off power switch 166, and a power port 168, such as a micro USB power port. The lens 108 and the LED light 119 can be mounted on the front panel 227 while the switch 166 and the port 168 an be mountable on the back panel 230. Also shown is a microphone 87 for picking up sound and an antenna 89 attached to a base generator 91. Electronic circuitries, such as a printed circuit board 236, are provided for the camera, power, communication, lighting, sound, and operational controls of the camera system 100. A mounting bracket 238 can be provided for securing the lens and light panel 227 to the housing frame 164. The lens and light panel 227 may also slide into a slot 244 provided at the front of the housing frame 164. In some embodiments, the two ends defining the slot 244 have a groove for receiving the two ends of the panel 227, similar to a tongue and groove arrangement. One or more rechargeable batteries are also provided to power the electronics. The batteries can be recharged by plugging the micro USB port to a power source.

A plurality of anchoring posts 246 can be provided with the housing frame 164 to receive a respective hold down screw 228 (FIG. 1) passing through the rim 126 and through the receiving bores 248 formed with the housing base 114. An arcuate cut-out 250 can be provided through the housing frame 164 near the slot 244 for accommodating the curvature of the lens 108. A raised platform section 252 can be provided below the cut-out 250 to enhance fit inside the housing base 114.

A plurality of mounting cut-outs 260 can be provided along the lower end of the housing frame 164. The mounting cut-outs 260 are sized and shaped to accommodate the plurality of receiving bores 248 on the housing base 114. This allows the housing frame 164 and the housing base 114 to nest during assembly.

An inner rim surface 262 having a plurality of teeth 264 is provided on the rim 126 of the housing base 114. The teeth 264 are configured to mesh with a corresponding set of teeth 266 located on the lower outer surface of the flange 268 on the base plate 122 of the base anchor 120. The matching set of teeth 264, 266 can allow the base anchor 120 to be angularly aligned to the housing base 114 in small increments to achieve a desired final angular position. In some embodiments, the base anchor 120 can rotate in 3 to 15 degree increments by sizing the number of teeth and teeth spacing appropriately. In some embodiments, the numbers of teeth are reduced to permit fewer angular alignment options or the surfaces are structured with only a single angular mounting position. The matching teeth 264, 266 may be viewed as a ratcheting system to enable the camera to rotate relative to the mounting base 104 to control the viewing angle of the lens.

As shown and previously described, the upper leg joint 132 on the mounting leg 130 can have a pair of aligned openings 286 formed on the upper leg joint 132 for aligning with the openings 280 on the mounting frame 124. Once aligned, the two may be secured with the screw 140 and nut 282.

In some embodiments, to assemble the camera body 102, the base anchor 120 is first placed into the housing base 114 with the mounting frame 124 extending out the opening 128 of the housing base 114. The teeth 264 on the housing base 114 and the teeth 166 on the base anchor 120 are aligned to a desired final angular position. The upper leg joint 132 is then projected into the opening 138 of the mounting frame 124 and the two secured thereto using the nut 282 and screw 140 combination.

Next, the housing frame 164 is lowered into the housing base 114 and the two are nested with the mounting cut-outs 260 aligned with the receiving bores 248. In some embodiments, the camera components, such as the lens 108, light 119, switch 166, power ports 168, and circuitries 236, are assembled to the housing frame 164 before the housing frame is lowered into the housing base 114. In an some embodiments, the camera components are assembled to the housing frame 164 after the housing frame is nested with the housing base 114. The rotating ring 112 is now placed over and around the exterior of the housing frame 164 so that the ring bottom 290 rests on the lip or shoulder 292 provided adjacent the track 232 on the housing frame.

For an embodiment with fastening requirement, the hold down screws 228 (FIG. 1) are then placed through the plurality of openings formed through the rim 126 of the housing base 114, then through the receiving bores 248 and through the anchoring columns 246 provided with the housing frame 164. The cap 110 is then placed over the assembly by sliding the two ribs 220 within the rotating ring 112 so that the detents 220a on the ribs 220 engage the corresponding detents 220b on the housing frame 164. At the same time, receiving threaded bores provided with the cap 110 are aligned with the hold down screws 228, which are used to threadedly secure the housing top 110. In an alternative embodiment, the hold down screws 228 are threaded into and held by the anchoring columns 246 provided in the housing frame 164. The cap 110 is then secured to the housing frame 164 via the detents 220a, 220b only, not the hold down screws.

Figure 6:
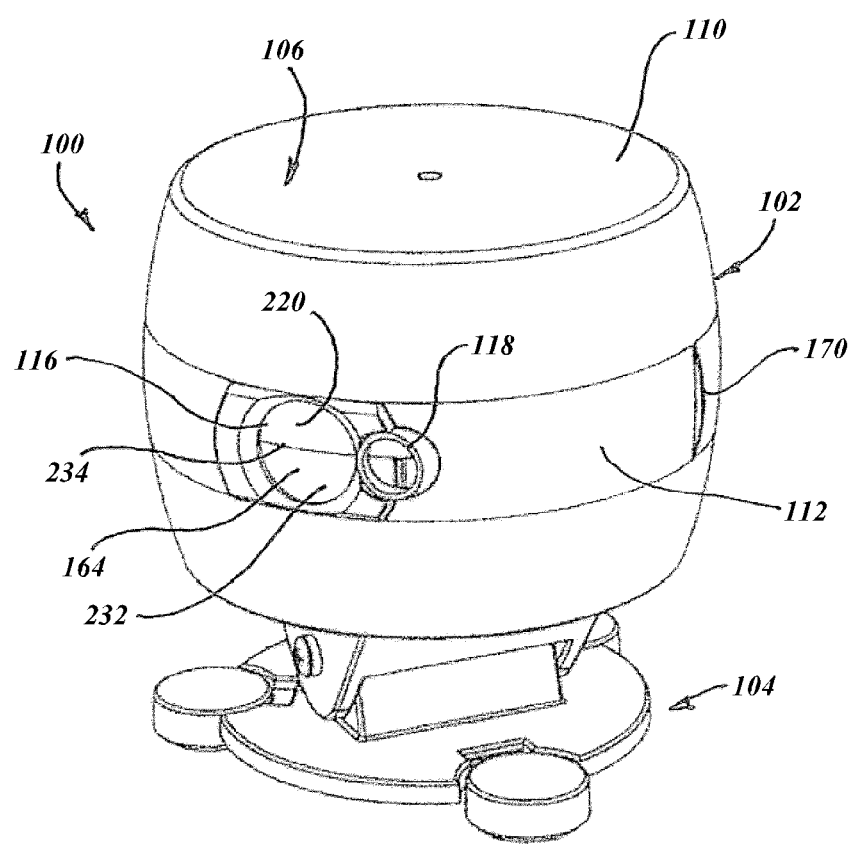
FIG. 6 is a schematic perspective view of the camera system of FIG. 1 from a different viewing angle and with the lens in a closed position.

FIG. 6 shows the camera system 100 of FIG. 1 in a camera closed position, which shows the ring 112 being rotated so that the first opening 116 and the second opening 118 are no longer aligned with the lens and the camera light, respectively. Although not shown, in the camera closed position of FIG. 6, the ring opening 162 of the ring 112 is not aligned over the camera switch 166 and the power port 168 (FIG. 2). In some embodiments, the ring can be rotated so that the one or more ridges 170 align with a recess or detent formed with the housing frame 164. This will provide the user with feedback that the ring is properly rotated to the closed position or to the open position. Preferably, the camera switch 166 is turned off prior to rotating the ring 112 to the camera closed position. In some embodiments, the ring 112 turns off the camera switch 166 upon rotation of the ring, or turns the camera on upon rotation of the ring. Once rotated, the interface 234 between the ribs 220 on the housing top 110 and the track 232 on the housing frame 164 can be seen through the ring opening 162. Also shown through the first opening 116 and the second opening 118 are part of the rib 220 and the housing frame 164.

Figure 7:
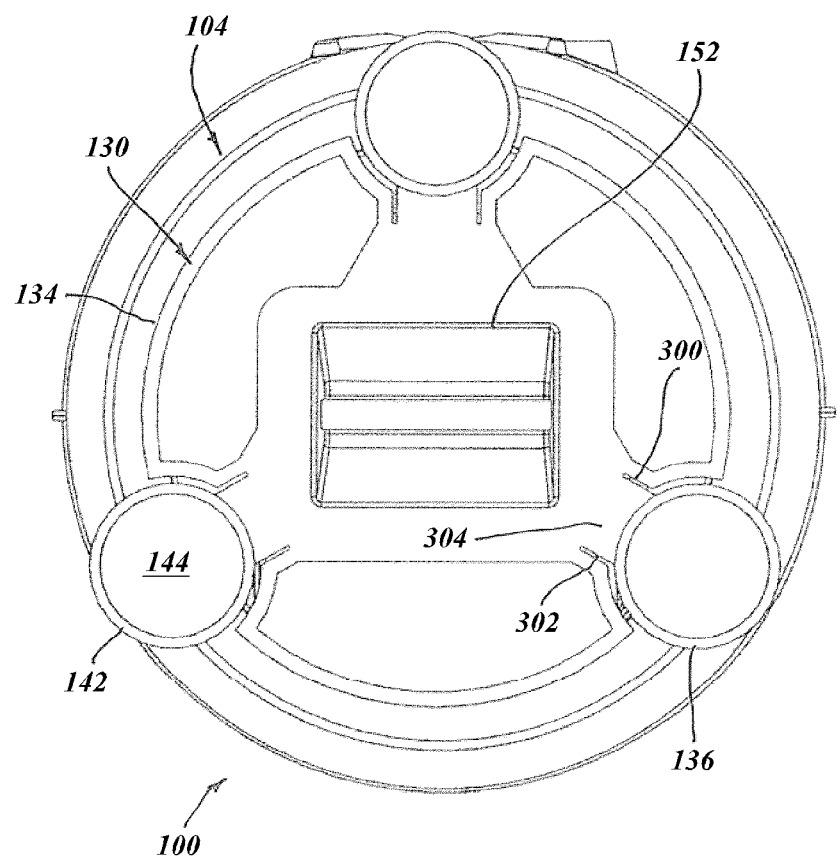
FIG. 7 is a bottom view of the camera system looking at the bottom of the mounting base.

FIG. 7 shows an end view of the camera system 100 of FIG. 1, looking up at the bottom of the mounting base 104. In the embodiment shown, a pair of slits 300, 302 is formed at each foot 136 to form a leaf spring 304. The leaf spring 304 gives each foot 136 some independent flexibility relative to the lower leg joint 134. This allows the camera 102 system to be attached to a surface that is not quite planar.

Figure 8:
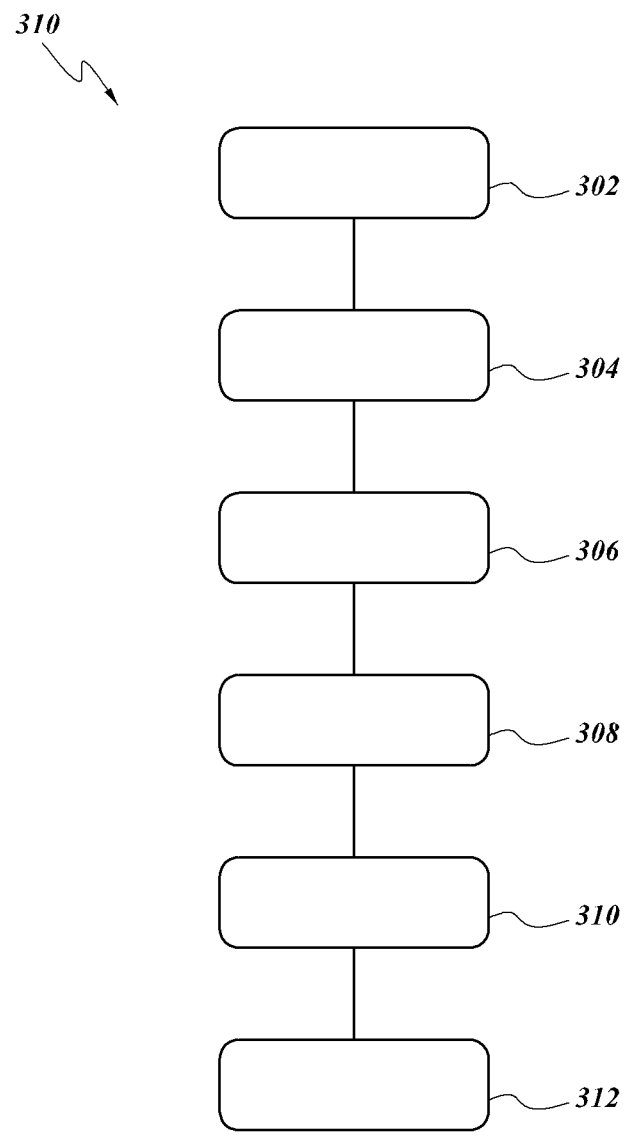
FIG. 8 is a process flow diagram showing an exemplary use of the camera system of FIG. 1.

FIG. 8 shows a process flow diagram depicting a method 310 for using a wireless camera system in accordance with aspects of the present disclosure. At step 302, the camera system 100 (FIG. 1) can be placed on a surface at an angle and/or orientation to be viewed through the lens 108 of the camera system. The camera system may be turned on before or after it is placed on the surface. The surface can be any manmade or naturally formed surface. In some embodiments, the surface can be part of an automobile. For example, the surface can be the frame or chassis of a car, the bumper of a car, the trunk of a car, or the roof of a car. The camera can also be mounted upright or upside down. The placement of the camera system on a surface can also comprise causing one or more magnet pieces or inserts located on a mounting base 104 of the camera system to attract a metallic surface. In some embodiments, a ring 112 on the camera body 102 is rotated before the camera is turned on. In some embodiments, the ring can be rotated after the camera is mounted to the surface. The camera 102 can create its own wireless communication signal and can provide a hotspot for wireless communication enable devices. For example, when the camera is turned on, the camera can emit WiFi signals that can be connected by a WiFi enabled device, such as a laptop, a smartphone, or a tablet.

At step 304, a software application on a WiFi enabled device can be activated to search for the WiFi signal emitted by the camera 102. Appropriate electronic handshake can be performed at step 306 to connect the WiFi enabled device to the camera system 100. In some embodiments, the electronic handshake can include a security step to authenticate the WiFi enabled device. In some embodiments, more than one camera systems 100, all with WiFi hotspot capabilities, can be placed on different parts of the surface or on different surfaces and the WiFi enabled device is connected to the more than one camera systems.

At step 308, the viewing angle of the camera lens 108 can be adjusted by pivoting the camera body 102 relative to the mounting base 104 (FIG. 1). Optionally, the viewing angle, color, contrasts, and lighting can be adjusted through software functions provided by the software application. For example, if the camera is mounted upside down under a car, the image can be rotated 180 degrees to adjust the viewing perspective of the camera. In some embodiments, the camera light 119 can be activated to provide illumination for the camera lens. The camera system can also be adjusted to change the side-to-side viewing perspective or angle. In some embodiments, the camera system can be pulled from the surface so that the magnet force is overcome to separate the camera system from the mounting surface. The camera can be then repositioned to a more preferred angular position. In some embodiments, the camera body 102 can be pivoted along an axis that is orthogonal to the up-down pivoting axis to adjust the side-to-side viewing angle.

If the WiFi enabled device is connected to two or more wireless camera systems, at step 310, the WiFi enabled device can be toggled to switch between the two or more wireless camera systems. At step 312, the camera system can be removed from the mounted surface and the camera ring 112 can be rotated to cover the camera lens. In some embodiments, as discussed above, the ring can be stationary and only a small shield or cover is activated to close the lens 108. In some embodiments, the camera light and camera port can be closed as well with the same closing mechanism or with a separate closing mechanism.

From the foregoing description, it will be appreciated that an inventive portable camera is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A camera system comprising:
a camera body fixedly secured to a mounting base, the camera body comprising:
  a housing having a central axis, a first upper side, and a second lower side and having a camera lens and electronics for generating wireless signals to create a wireless connection hotspot located inside the housing and operating the camera system; and
  a ring having at least one opening rotatably mounted about the central axis and configured to rotate between an open position to expose the lens so that the at least one opening is positioned over the lens to a closed position to cover the lens;
the mounting base comprising a lower leg joint comprising at least one magnetic insert located further away from the first upper side than the second lower side for mounting the camera system to a metallic surface.

2. The camera system of claim 1, wherein the ring has a second opening configured to be rotatable to expose or cover a light source.

3. The camera system of claim 2, wherein the light source is an LED light source.

4. The camera system of claim 1, wherein the lower leg joint comprises a plurality of magnetic inserts.

5. The camera system of claim 1, wherein the housing comprises a camera switch and power port.

6. The camera system of claim 5, wherein the ring has a third opening and a fourth opening configured to be rotatable to expose or cover the camera switch and power port.

7. The camera system of claim 1, wherein an audible signal occurs when the ring is in the open position and the closed position.

8. The camera system of claim 1, wherein rotation of the ring to the open position activates the electronics for the camera system.

9. The camera system of claim 1, wherein rotation of the ring to the closed position deactivates the electronics for the camera system.

10. The camera system of claim 1, further comprising software configured to vertically flip an image from the camera lens.

11. The camera system of claim 1, further comprising a microphone.

12. The camera system of claim 1, wherein the camera body is configured to rotate with respect to the mounting base.

13. A method for using a camera system, the method comprising:
placing a magnetic insert located on a mounting base fixedly secured to a camera body on a metallic surface of an automobile, the camera body comprising:
  a housing having a central axis, a first upper side, and a second lower side and having a camera lens and electronics for generating wireless signals to create a wireless connection hotspot located inside the housing and operating the camera system; and
  a ring having at least one opening rotatably mounted about the central axis and configured to rotate between an open position to expose the lens so that the at least one opening is positioned over the lens to a closed position to cover the lens;
powering up the camera body to produce a WiFi signal and creating a WiFi hotspot; and
using the WiFi signal to connect a WiFi enabled device to the camera system.

14. The method of claim 12, wherein the ring has a second opening configured to be rotatable to expose or cover a light source.

15. The method of claim 14, wherein the light source is an LED light source.

16. The method of claim 12, further comprising rotating the ring to the open position to activate the electronics for the camera system.

17. The method of claim 12, further comprising rotating the ring to the closed position to deactivate the electronics for the camera system.

18. The method of claim 12, wherein the housing comprises a camera switch and power port.

19. The method of claim 18, wherein the ring has a third opening and a fourth opening configured to be rotatable to expose or cover the camera switch and power port.

20. A camera system comprising:
a camera body comprising:
  a housing having a central axis, a first upper side, and a second lower side and having a camera lens and electronics for generating wireless signals to create a wireless connection hotspot located inside the housing and operating the camera system; and
  a band having at least one opening rotatably mounted about the central axis and configured to rotate between an open position to expose the lens so that the at least one opening is positioned over the lens to a closed position to cover the lens; and
a mounting base comprising at least one magnetic insert, the mounting base fixedly secured to the camera body.

21. The camera system of claim 1, wherein the at least one opening extends through the ring.

22. The camera system of claim 1, wherein the ring surrounds the opening.

23. The camera system of claim 1, wherein the ring is configured to rotate circumferentially about a fixed circumferential axis.

* * * * *